April 17, 1928.
H. NAGIN
TREAD CARRIER
Filed Aug. 19, 1926
1,666,341
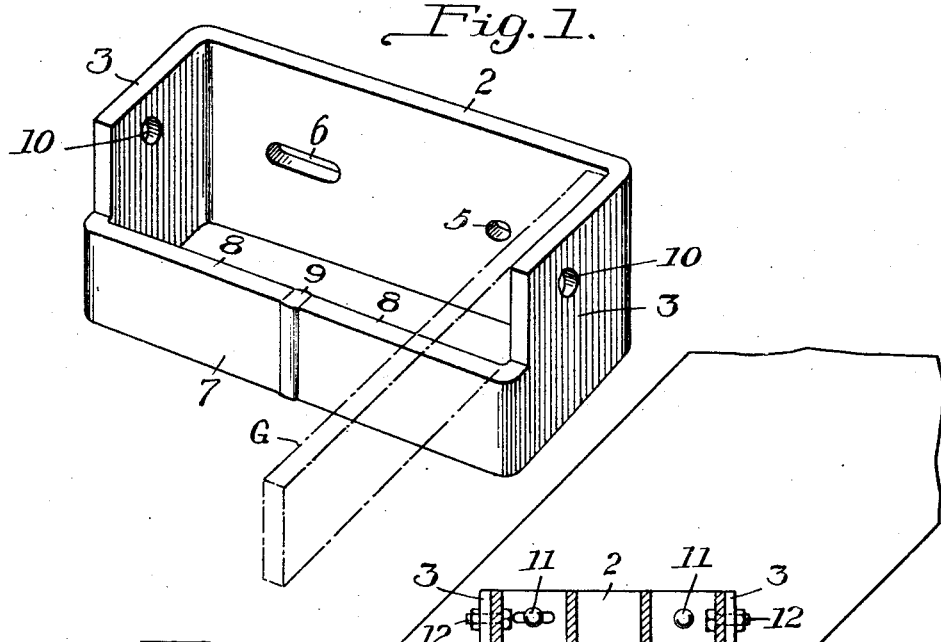
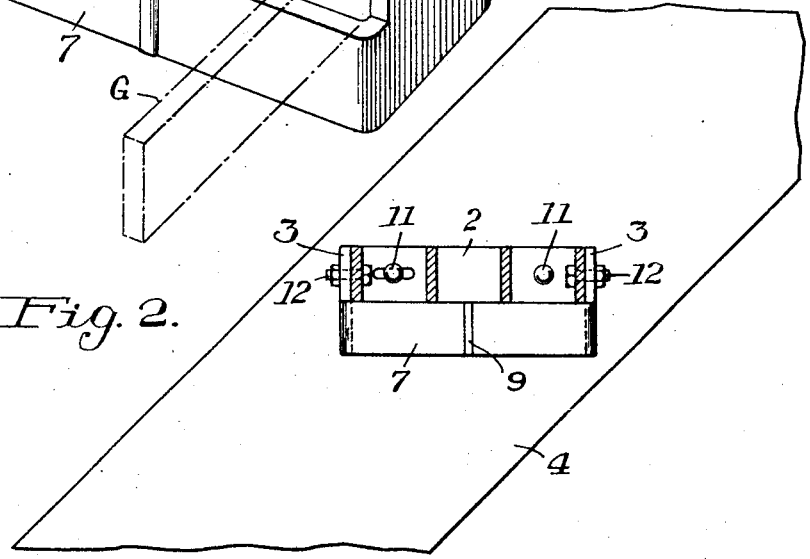
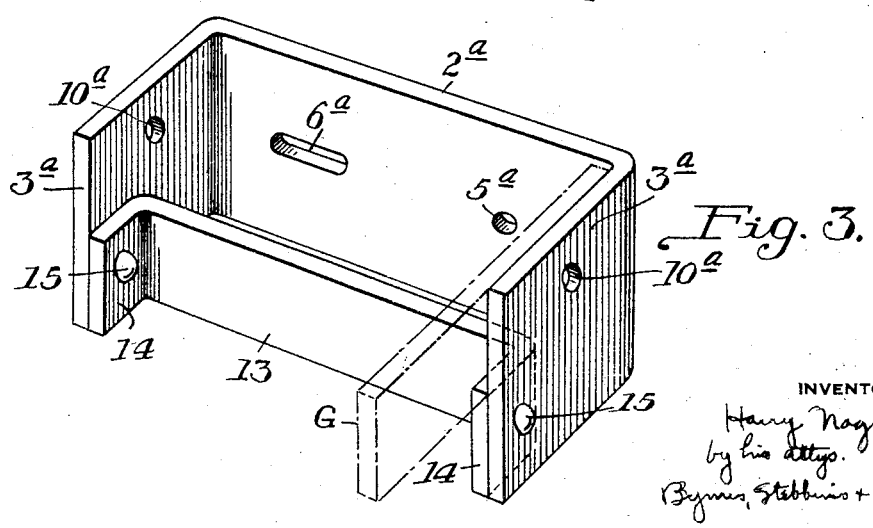
INVENTOR
Harry Nagin
by his attys.
Byrnes, Stebbins & Parmelee Patented Apr. 17, 1928.

1,666,341

UNITED STATES PATENT OFFICE.

HARRY NAGIN, OF PITTSBURGH, PENNSYLVANIA, ASSIGNOR TO THE TRI-LOK COMPANY, OF PITTSBURGH, PENNSYLVANIA, A CORPORATION OF PENNSYLVANIA.

TREAD CARRIER.

Application filed August 19, 1926. Serial No. 130,138.

This invention relates to tread carriers and is particularly useful for holding gratings which are employed as stair treads, although it may be used with other types of stair treads, if desired.

Stair tread carriers, as heretofore constructed, have generally comprised an angle secured to the stair risers and having a horizontal face upon which the treads are mounted. Sometimes upwardly extending portions have been provided for securing the treads in place. Carriers of this type are open to the objection that they invariably collect a large amount of dirt, thus bringing about unsightly and unsanitary conditions.

I provide a tread carrier comprising an attachment portion lying in a substantially vertical plane and a tread supporting portion spaced from such attachment portion, the tread supporting portion also lying in a substantially vertical plane. Preferably the carrier is made with a strip which is U-shaped when viewed in plan and has a bridge member across the open end of the U, the bridge member being of less thickness than the U-shaped strip so as to accommodate the end of the stair tread and leave the top face of the stair tread in the general plane of the top of the U-shaped strip. The bridge member may be either integral with the U-shaped strip, or it may be a separate piece permanently secured thereto.

In the accompanying drawings which illustrate two forms of my invention, and one modification thereof, Figure 1 is a perspective view of a tread carrier constructed according to my invention;

Figure 2 is a vertical section through one tread of a stairway employing the carrier shown in Figure 1; and Figure 3 is a perspective view of a modified form of carrier.

The carrier shown in Figure 1 comprises a strip of metal bent in the form of a U with a base 2 and arms 3. The base 2 forms an attachment portion which is secured to a stairway riser 4. For purposes of attachment it is provided with a circular opening 5 and a slotted opening 6 to accommodate bolts or rivets. The arms 3 of the U-shaped strip form connecting portions by which the supporting portion for the stairway tread is carried.

The supporting portion comprises a bridge 7 extending from the ends of the arms 3. As shown in Figure 1, the bridge is made of two parts 8 which are integral with the arms 3 but bent at right angles thereto. The portions 8 are joined by a weld 9.

It will be noted that the bridge 7 is of materially less depth than the U-shaped strip proper. This is so as to permit of inserting a stair tread in such manner that the top of the tread lies substantially flush with the top of the U-shaped strip.

In Figure 1 I have shown a girder bar G in chain lines, this girder bar being one of several in a stair tread grating. Holes 10 are provided in the arms 3 to accommodate bolts for holding the tread in place.

In Figure 2 I have shown rivets 11 fitted into the holes 5 and 6 for securing the carrier to the stairway riser 4, and have also shown bolts 12 for holding the stairway tread in place.

Figure 3 shows a modified form of structure and similar parts therein have been given the same reference characters with an "a" suffixed thereto. In this form of the invention the bridge is not made integral with the U-shaped strip, but is a separate piece. The bridge comprises a U-shaped member 13 having arms 14 which lie inside the arms 3ª and are secured thereto by rivets 15. Holes 10ª are provided for fastening the stairway treads in place.

I have illustrated and described a preferred embodiment of the invention, but it will be understood that it is not thus limited, since it may be otherwise embodied within the scope of the following claims:—

I claim:—

1. A tread carrier comprising a strip of metal bent to form a base adapted for attachment to a stairway riser, an integral portion extending outwardly from the base, and an integral tread supporting portion extending at an angle to the outwardly extending portion.

2. A tread carrier comprising a strip of metal bent to form a base adapted for attachment to a stairway riser, an integral portion extending outwardly from the base, and an integral tread supporting portion extending at an angle to the outwardly extending portion, the last mentioned portion lying in substantial parallelism with the base.

3. A tread carrier comprising a strip of metal bent to form a base adapted for attachment to a stairway riser, an integral portion extending outwardly from the base, and an integral tread supporting portion extending at an angle to the outwardly extending portion, the last mentioned portion being of less depth than the base and the outwardly extending portion.

4. A tread carrier comprising a strip of metal bent to form a U-shaped member whose arms extend outwardly from the intermediate portion, said intermediate portion being formed as a base adapted for attachment to a stairway riser, and integral portions extending from the outer ends of the arms and forming a tread supporting portion, the last mentioned portions being connected together so as to form a substantially closed loop.

5. A tread carrier comprising a strip of metal bent to form a U-shaped member whose arms extend outwardly from the intermediate portion, said intermediate portion being formed as a base adapted for attachment to a stairway riser, and integral portions extending from the outer ends of the arms and forming a tread supporting portion, the ends of the last mentioned portions lying adjacent one another and being connected by welding.

In testimony whereof I have hereunto set my hand.

HARRY NAGIN.